July 10, 1928.
M. E. CUENDET
CAMERA SHUTTER
Filed May 21, 1926
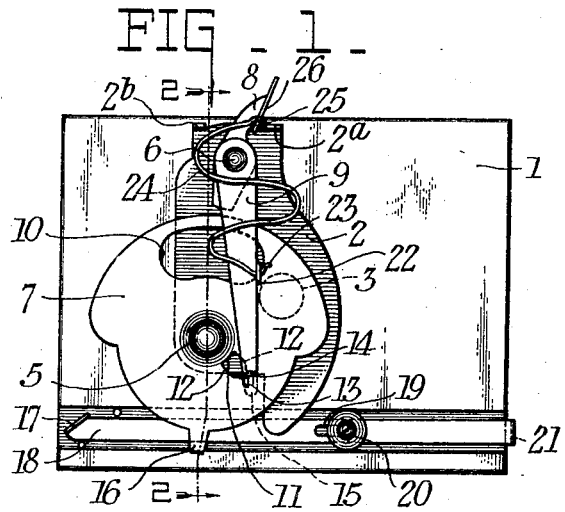
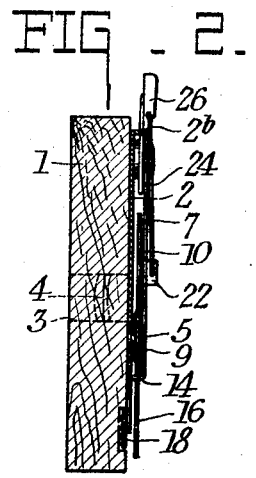
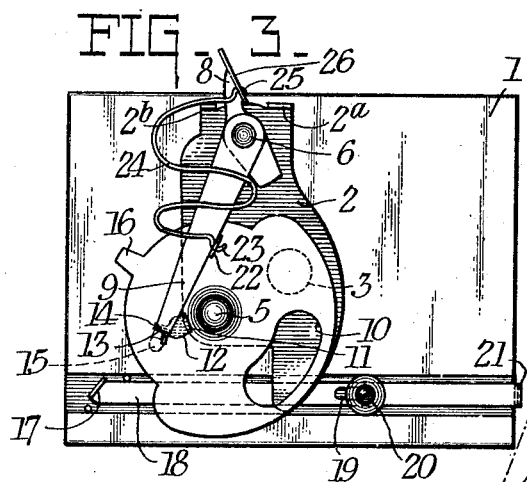
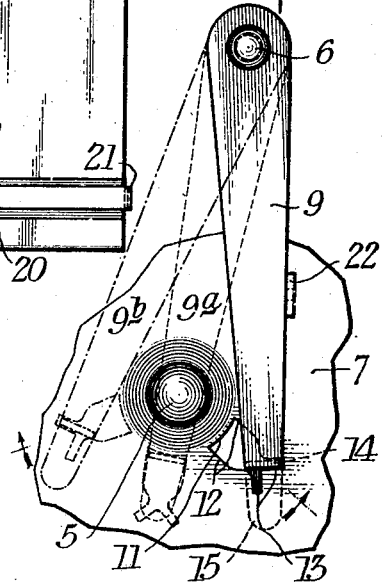
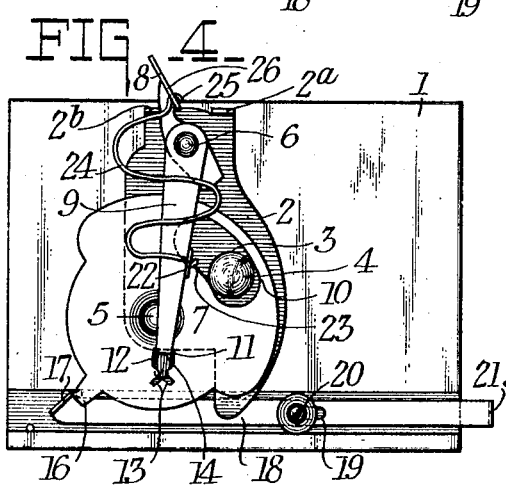
INVENTOR,
Maurice E. Cuendet,
BY
ATTORNEYS.

Patented July 10, 1928.

1,676,529

UNITED STATES PATENT OFFICE.

MAURICE EUGÈNE CUENDET, OF LAUSANNE, SWITZERLAND, ASSIGNOR TO EASTMAN KODAK COMPANY, OF ROCHESTER, NEW YORK, A CORPORATION OF NEW YORK.

CAMERA SHUTTER.

Application filed May 21, 1926. Serial No. 110,678.

This invention relates to photography and more particularly to shutters for simple photographic cameras. One object of my invention is to provide a simple shutter for making time and instantaneous exposures; another object is to provide a shutter trigger which is easy to operate and which is sure in action; another object is to provide a shutter blade operating lever which limits the movement of the shutter blade; another object is to provide a connection between the operating lever and the shutter lever by which the former is held against rebound at the end of its movement by the latter; another object is to provide a lug and cam drive for the shutter blade; another object is to provide a driving connection in which the driving lever may start and may come to rest slightly in advance of the shutter blade; another object is to provide an actuating lever which controls both the movement and the position of rest of the shutter blade; another object is to provide a shutter mechanism in which the shutter blade can not move the blade actuating lever, and other objects will appear hereinafter, the novel features being particularly pointed out in the claims at the end of the specification.

Coming now to the drawings, where like reference characters denote like parts throughout:

Fig. 1 is a rear elevation of a shutter block carrying a shutter, constructed in accordance with and embodying one form of my invention;

Fig. 2 is a section on line 2—2 of Fig. 1;

Fig. 3 is similar to Fig. 1, but with the parts in a different position;

Fig. 4 is similar to Fig. 1, but with the shutter parts in "time exposure" position; and Fig. 5 is an enlarged fragmentary detail showing parts of the shutter blade and the blade operating lever.

In the embodiment shown in the drawings, there is a shutter block 1 which may be mounted in or attached to a camera in any well known manner. A base plate 2 is carried by this block and there is an aperture 3 extending through the block and base plate. An objective 4 may be mounted in this aperture.

Plate 2 carries a pair of studs 5 and 6, the former pivotally supporting the shutter blades 7 and the latter pivotally supporting a trigger 8 and a lever 9.

The shutter blade 7 is provided with an arcuate exposure opening 10 and a slot 11. This slot comprises an elongated opening having cam sides 12, at one end of which there are a pair of angularly disposed slots 13. A bent portion 14 of lever 9 passes through the slot 11 so that it may engage either the cam sides of the slot 12 or the end slots 13. After passing through the slot 11 part 14 is bent into a foot 15 which may lie flat upon the base block 1. This spaces the lever 9 from the plate 2 and provides an adequate space for the shutter blade 7 to move between the block and the lever.

The lever 9 is provided with an upstanding lug 22 in which the end 23 of an S-shaped spring 24 is attached. The opposite end 25 of the spring is attached to a flange 26 bent from the trigger 8. This spring always tends to hold the lever 9 and the trigger 8 on the same side of the pivot 6, so that by moving the trigger to the opposite side of this pivot the spring is tensioned and released, and the lever 9 is moved, thus moving the shutter blade 7. The extent of movement of the trigger 8 is controlled by the stops $2^a$ and $2^b$.

In order to make time exposures, the shutter blade 7 is provided with a lug 16. This lug may be engaged by a stop 17 carried by the arm 18, which is provided with a slot 19 which may slide about the pin 20. A handle 21 is used to move this arm from the position shown in Figs. 1 and 2, wherein 17 lies beyond the path of movement of lug 16 to the position shown in Fig. 4, wherein the lug 16 will strike and be stopped by the lug 17 for time exposures.

As indicated in Fig. 5, the arm 9 controls both the position of rest of the shutter blade 7 and the movement of this blade about its pivot 5. In making an exposure, part 14 of lever 9 is moved by spring 24 away from an angularly disposed slot 13 into contact with a cam surface 12. The first part of this movement is made without moving the shutter blade. When, however, part 14 strikes a cam edge 12, it will slide against this cam surface towards the top of the elongated opening until the lever 9 reaches the position shown at $9^a$. Further movement will cause the lever to move downwardly along the same cam surface 12, until the lever reaches the position shown at 9ᵇ, wherein part 14 will lie in the other angularly disposed slot 13. This position latches the shutter blade 7 against rebound, since any movement of blade 7 about pivot 5 will be opposed by the lug and slot connection.

It should be noted that with my preferred construction, there are no pins, lugs or other stops used to limit the movement of the shutter blade 7. Lever 9 forms the sole means for holding the blade at rest and for moving it between its two positions of rest. Force applied to the shutter blade 7 can not move the lever 9.

The operation of my shutter is as follows: With lever 21 in the position shown in Fig. 1 to make an "instantaneous exposure", the trigger 8 is moved from the stop 2ᵃ to the stop 2ᵇ about its pivot 6. This tensions spring 24 and permits it to swing lever 9 about pivot 6, thus causing lug 14 to leave slot 13, engage a cam 12, swinging the shutter blade 7 about its pivot 5, and upon completing the movement necessary to make the instantaneous exposure, part 14 will latch the shutter blade 7 against movement by entering slot 13. If a time exposure is desired, lever 21 is drawn out to the position shown in Fig. 4, so that upon moving trigger 8, the shutter blade will be moved until lug 16 engages stop 17, in which position the objective 4 will be uncovered, since the opening 10 will lie beyond the end of aperture 3. The trigger 8 may then be moved in a reversed direction causing the shutter blade 7 to move back to its initial position. If desired, instead of again moving the trigger 8 the handle 21 may be depressed, thus releasing lug 16 and permitting the movement of shutter blade 7 to continue to complete the time exposure.

While I have described and illustrated a preferred embodiment of my invention I do not wish to be limited to this embodiment, except as set forth in the following claims.

Having thus described my invention, what I claim as new and desire to secure by Letters Patent is:

1. In a photographic shutter, the combination with a blade having an elongated slot terminating in a pair of spaced slots, shutter operating mechanism including a lever adapted to be moved, said lever having a portion engaging the slot, being adapted to move the shutter by engaging the elongated slot and being adapted to hold the shutter blade in a fixed position by engaging one of the spaced slots.

2. In a photographic shutter, the combination with a movably mounted shutter blade having a slot cut therein, both edges of the slot forming cams, shutter operating mechanism including a lever adapted to engage the cams, a pivotal mount upon which the lever may be swung in two directions by the shutter operating mechanism through a fixed path, said lever being adapted to engage an edge forming one cam for moving the blade in one direction as the lever is moved through its path in one direction, and being adapted to engage the other cam edge for moving the shutter blade in an opposite direction as the lever is moved through its path in the other direction.

3. In a photographic shutter, the combination with a movably mounted shutter blade, and shutter operating mechanism including a single movably mounted lever adapted to engage the shutter blade, a spring for actuating the lever, said lever and spring being the sole means for moving the blade and for holding the blade in two positions.

4. In a photographic shutter, the combination with a shutter blade having an elongated slot therein, means for moving and latching the blade against movement including a lever engaging the slot, shutter operating mechanism connected to the lever, said lever being adapted to drive the blade when in engagement with one portion of the slot and being adapted to latch the blade against movement when in engagement with another portion of the slot.

5. In a photographic shutter, the combination with a blade member adapted to be moved back and forth, of shutter operating mechanism for moving the blade including a lever, a lug and slot connection between the lever and blade, said slot being arranged so that in driving the blade in one direction the lug may engage one side of the slot, and in driving the blade in another direction the lug may engage the other side of the slot.

6. In a photographic shutter, the combination with a shutter blade having an elongated slot and a pair of angularly disposed slots therein, a pivot upon which the blade may move, shutter operating mechanism including a lever pivotally mounted, a portion of the lever being adapted to slidably engage the blade slots, said lever being also adapted to engage a slot to latch the blade against movement.

7. In a photographic shutter, the combination with a shutter blade having an elongated slot and a pair of angularly disposed slots therein, a pivot upon which the blade may move, shutter operating mechanism including a lever pivotally mounted, a portion of the lever being adapted to slidably engage the blade slots, and also being adapted to latch the blade against movement at one end of its possible movement by engaging one angularly disposed slot and to latch the blade against movement at the other end of its possible movement by engaging the other angularly disposed slot.

8. In a photographic shutter, the combination with a blade operating mechanism comprising a base, a trigger and lever pivotally mounted on the base and a spring connecting the trigger and lever, of a shutter blade having a slot therein engaged by the lever, whereby the blade may be moved through the blade operating mechanism.

9. In a photographic shutter, the combination with a blade operating mechanism comprising a stud, a trigger and lever mounted on the stud, an S-shaped spring connecting the lever and trigger, a movably mounted shutter blade having a slot therein, the position and movement of the shutter blade being adapted to be controlled solely by the lever.

10. In a photographic shutter, the combination with a movably mounted shutter blade, shutter operating mechanism including a lever, a mount carrying the lever upon which the lever may be moved through a path by the shutter operating mechanism, parts of the lever and shutter cooperating whereby movement of the lever may be transmitted, the shutter blade causing the latter to move as the lever is moved through its path, said cooperating parts holding the shutter stationary when the lever is not moved by the shutter mechanism.

11. In a photographic shutter, the combination with a shutter blade, of a pivotal support upon which the shutter blade is carried, shutter operating mechanism including a lever, a pivotal support for the lever upon which the lever may be moved by the shutter mechanism, a lug and slot connection between the shutter blade and lever through which said lever may drive the shutter under the influence of the shutter mechanism, said lug and slot connection also constituting a latch by which the blade may be held stationary through the lever.

Signed at Lausanne, Switzerland, this 17th day of April, 1926.

MAURICE EUGÈNE CUENDET.